(12) United States Patent
McGuire et al.

(10) Patent No.: US 9,013,121 B2
(45) Date of Patent: Apr. 21, 2015

(54) TRANSMISSION LINE AUTOTENSIONER

(75) Inventors: Drew Benton McGuire, Birmingham, AL (US); Dennis Mize, Atlanta, GA (US); Stephan Hicks, McDonough, GA (US)

(73) Assignee: Southern Company Services, Inc., Birmingham, AL (US)

(*) Notice: Subject to any disclaimer, the term of this patent is extended or adjusted under 35 U.S.C. 154(b) by 362 days.

(21) Appl. No.: 13/570,330

(22) Filed: Aug. 9, 2012

(65) Prior Publication Data

US 2014/0041926 A1 Feb. 13, 2014

(51) Int. Cl.
*B65H 23/198* (2006.01)
*H02G 7/02* (2006.01)

(52) U.S. Cl.
CPC .................................... *H02G 7/02* (2013.01)

(58) Field of Classification Search
CPC ....................................................... H02G 7/02
USPC ............................................... 318/6, 34, 558
See application file for complete search history.

(56) References Cited

U.S. PATENT DOCUMENTS

| | | | | |
|---|---|---|---|---|
| 3,670,975 A | * | 6/1972 | Tomimatsu | 242/413.1 |
| 4,381,852 A | * | 5/1983 | Ferree et al. | 242/411 |
| 5,480,085 A | * | 1/1996 | Smithe et al. | 226/44 |
| 5,535,579 A | * | 7/1996 | Berry et al. | 57/13 |

* cited by examiner

*Primary Examiner* — David S Luo
(74) *Attorney, Agent, or Firm* — Thomas/Horstemeyer, LLP

(57) ABSTRACT

Various systems and methods are provided for autotensioning conductors of transmission lines. In one embodiment, among others, an autotensioner system includes tensioning assemblies coupled between a structure and corresponding conductors and a tension controller that controls a tensioning assembly to adjust a tension of the corresponding conductor to within a predefined tolerance of a corresponding tension setpoint. In another embodiment, a method includes receiving a current conductor tension for each of multiple conductors and adjusting the conductor tension of one of the conductors by remotely controlling a corresponding tensioning assembly. The adjustment may be based at least in part upon the current conductor tensions and a tension setpoint.

18 Claims, 10 Drawing Sheets

TRANSMISSION LINE AUTOTENSIONER

BACKGROUND

Installation of transmission lines, during new construction or line replacement, involves a great deal of planning and preparation. One aspect of the transmission line design is the conductor tension, which influences the design of support structures and line rating. Conductor tension is adjusted to provide the proper sag depth to meet clearance requirements during transmission line operation. In addition, support structures are designed to take into account the differential loading imposed as conductors are manually adjusted to the desired tension.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
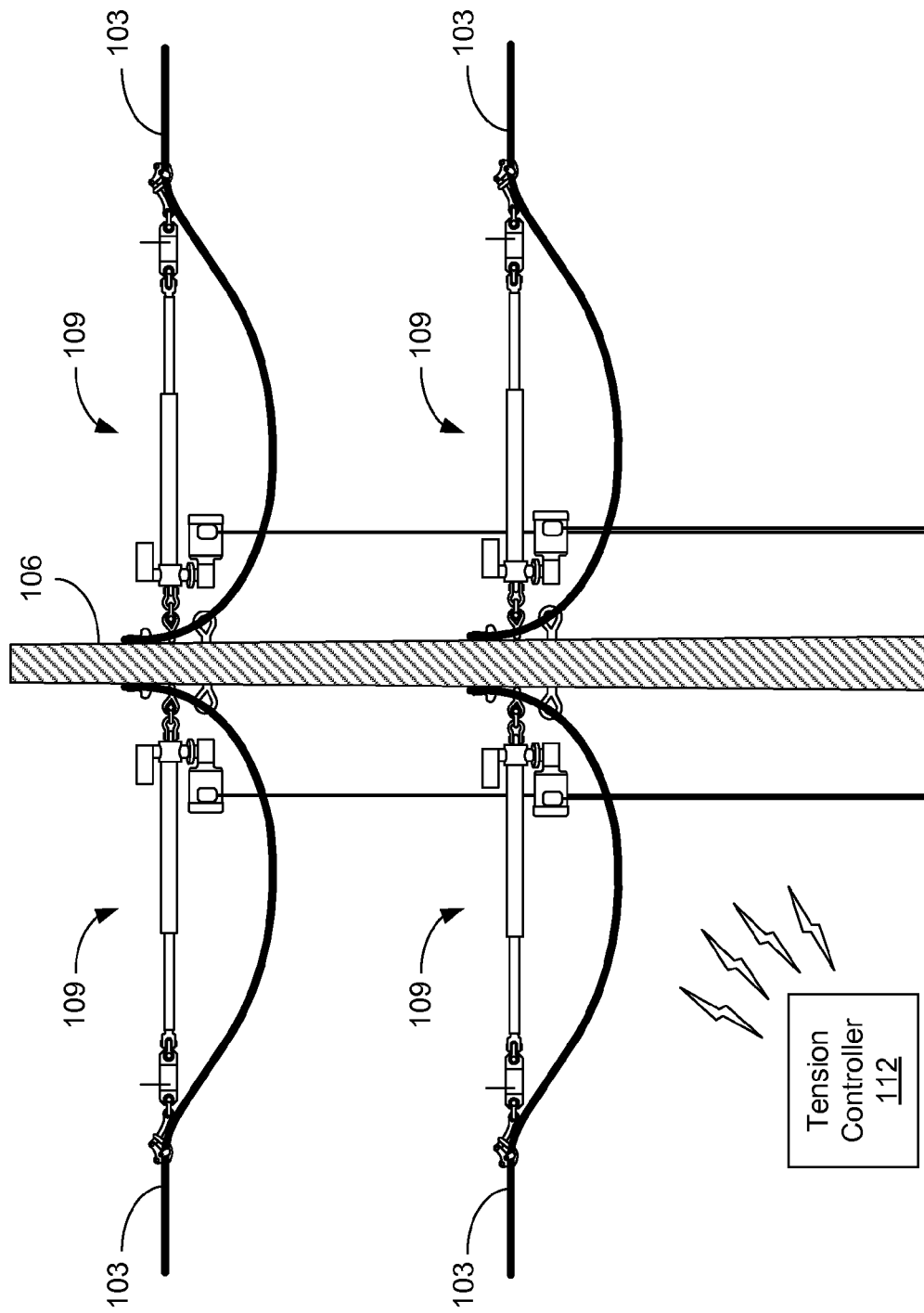
FIG. 1 is an example of an autotensioner system for balanced tensioning of conductors in accordance with various embodiments of the present disclosure.

Disclosed herein are various embodiments related to conductor tensioning of transmission lines. Reference will now be made in detail to the description of the embodiments as illustrated in the drawings, wherein like reference numbers indicate like parts throughout the several views.

Electrical power systems commonly use multiple conductors strung between supporting structures to distribute power to various end users. Two or three conductors are used to provide single-phase or three-phase power. In some cases, an additional shield conductor is also provided between the structures for lightning protection. When installing the conductors, line tension is manually adjusted to provide the proper sag depth during operation. Initially, conductors installed on one side of a structure are brought to a tension that is approximately at the designed value by a drum puller and/or bull wheel tensioner. The design value can be based upon hyperbolic equations that provide an allowable sag and tension of the conductors for a given span between supporting structures. Each conductor may then be individually fine tuned to the designed tension by a lineman using a chain hoist. As the tension of each conductor is changed, the deflection of the support structure changes, affecting the tension of the other conductor(s) which may need further adjustment. Final connections of the conductors are made to insulators mounted on the structure, and each conductor is considered to remain at its final design tension.

Conductors are then connected to the other side of the structure and adjusted to the designed tension using a similar process. It can be reasonably concluded that the conductors initially installed are now not actually at the correct tension. As the tension on one side of the support structure is varied, the tension of the conductors on the other side of the structure is changed as well. When final connections are made on one side of the support structure, the tension is based upon the existing deflection of the structure. As conductors on the other side of the support structure are tensioned, the structure is pulled in that direction, changing the previous deflection and thus the tension of the previously secured conductors. Depending upon the arrangement of the structure and the conductor connections, the line tension of one set of conductors may be higher or lower than the designed value. A lower tension may result in a greater sag depth of the conductor, which may not meet clearance requirements. A higher tension may result in unbalanced and/or increased strain on the structure that could compromise the integrity of the supporting structure.

Referring to FIG. 1, shown is an example of an autotensioner system for balanced tensioning of conductors supported by a structure. While the example of FIG. 1 depicts two conductors 103 on either side of the structure 106, the autotensioner system may be extended to include tensioning of additional conductors (e.g., three, four, or more) as will be understood. The autotensioner system includes tensioning assemblies 109, each coupled to the supporting structure 106 and a corresponding conductor 103. The tensioning assemblies 109 are communicatively coupled to a tension controller 112, which is configured to coordinate the operation of the tensioning assemblies 109. The tension controller 112 may include a computing device such as, e.g., a laptop computer, tablet, or other portable computing device.

Figure 2:
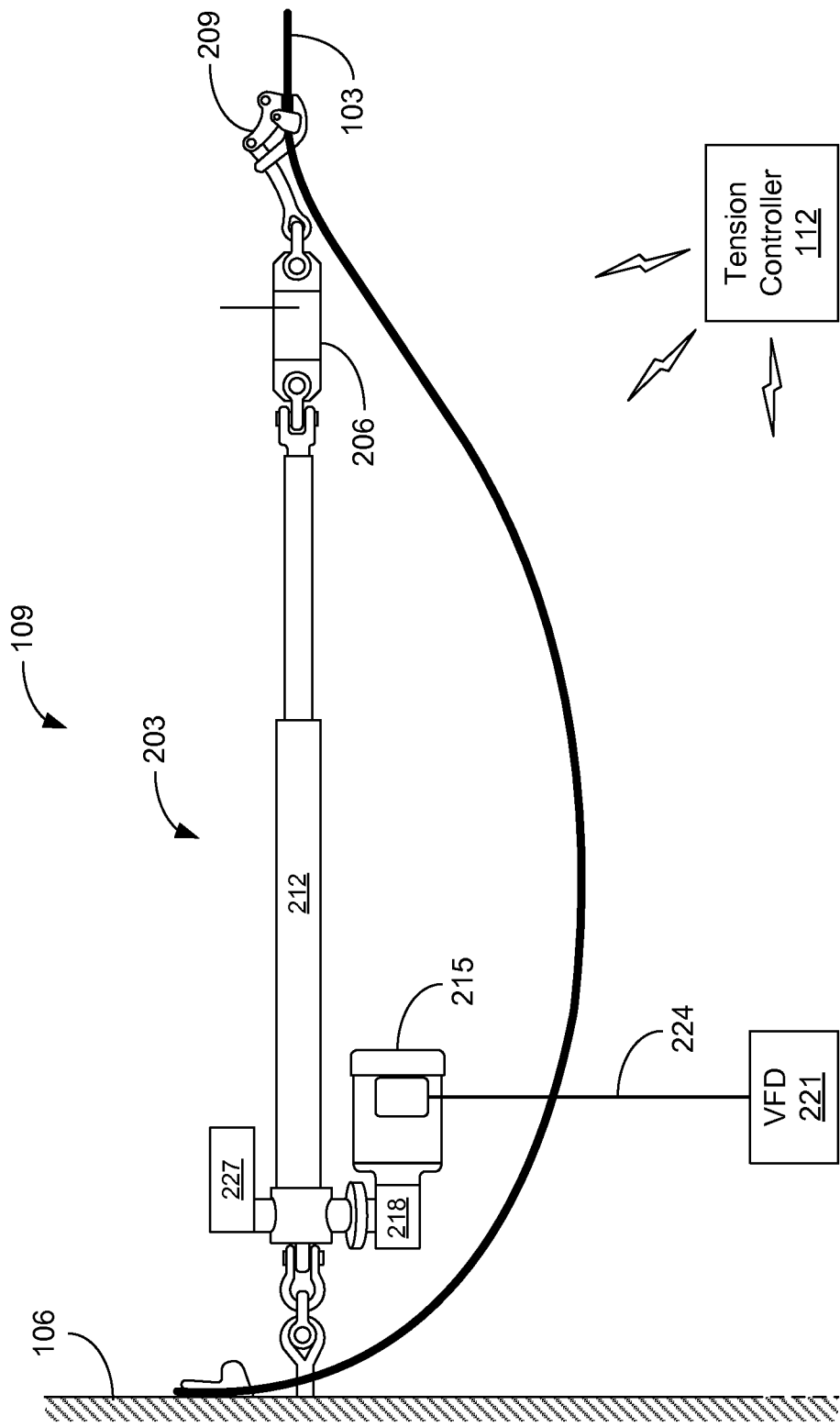
FIG. 2 is an example of a tensioning assembly of the autotensioner system of FIG. 1 in accordance with various embodiments of the present disclosure.

Referring next to FIG. 2, shown is an enlarged representation of a tensioning assembly 109 coupled between the conductor 103 and the structure 106. The tensioning assembly 109 includes a controlled tension cylinder 203 coupled at a proximal end to the structure 106 and at a distal end to the conductor 103. In the embodiment of FIG. 2, the proximal end of the controlled tension cylinder 203 is secured to the structure 106 by, e.g., an eye-bolt and/or one or more shackles or other appropriate fastening device(s). The distal end of the controlled tension cylinder 203 of FIG. 2 is coupled to a load cell 206 which, in turn, is coupled to a cable clamp 209 such as, e.g., a Chicago grip or a Haven grip. While the load cell 206 is shown connected by shackles (or other appropriate fastening devices) between the distal end of the controlled tension cylinder 203 and the cable clamp 209, in other implementations the load cell 206 may be connected between the structure 106 and the proximal end of the controlled tension cylinder 203 with the cable clamp 209 coupled to the distal end of the controlled tension cylinder 203 through an appropriate fastening device(s).

In the example of FIG. 2, the controlled tension cylinder 203 includes a screw drive 212 driven by an electric motor 215 through a gear box 218. The electric motor 215 may be driven by a variable frequency drive (VFD) 221 connected through a supply line 224 to control the speed and position of the screw drive 212. In other embodiments, a stepper motor and controller or other appropriate drive system may be used to position the screw drive 212. In alternative embodiments, a hydraulic drive system may be utilized. By adjusting the length of the screw drive 212, the tension of the corresponding conductor may be adjusted. The load cell 206 monitors the tension of the conductor 103 coupled to the screw drive 212. A drive sensor 227 can also be included to monitor the speed and/or position of the screw drive 212. The tension controller 112 can be communicatively coupled to the load cell 206 and/or the drive sensor 227 through one or more wireless connection(s) such as, e.g., Bluetooth or other radio frequency (RF) connection or through one or more wired connection(s) to obtain data and/or information about operational conditions. The VFD 221 is also communicatively coupled to the tension controller 112 to provide control signals to the VFD 221 for coordination of the tensioning of the conductors 103.

The tension controller 112 is configured to control the operation of each controlled tension cylinder 203 to adjust the tension of each conductor 103 while balancing the tensions of the conductors 103 on opposite sides of the supporting structure 106. By controlling the frequency supplied by the VFD 221 to the motor 215, the rate at which the tension is increased or decreased may be varied. Initially, each of the conductors 103 on both sides of the support structure 106 is brought to a tension that is approximately at the designed value. The may be carried out in a side-by-side fashion to minimize the deflection of the structure 106. The tensioning assemblies 109 are coupled between the structure 106 and each conductor 103 as illustrated in FIGS. 1 and 2. While the example is described with respect to adjusting the tension of four conductors 103, the example may be extended to include configurations with additional conductors 103 (e.g., six or eight) coupled to opposite sides of the support structure 106. Once the tensioning assemblies 109 have been installed, the tension controller 112 may be used to control the tension of the conductors 103.

Figure 3:
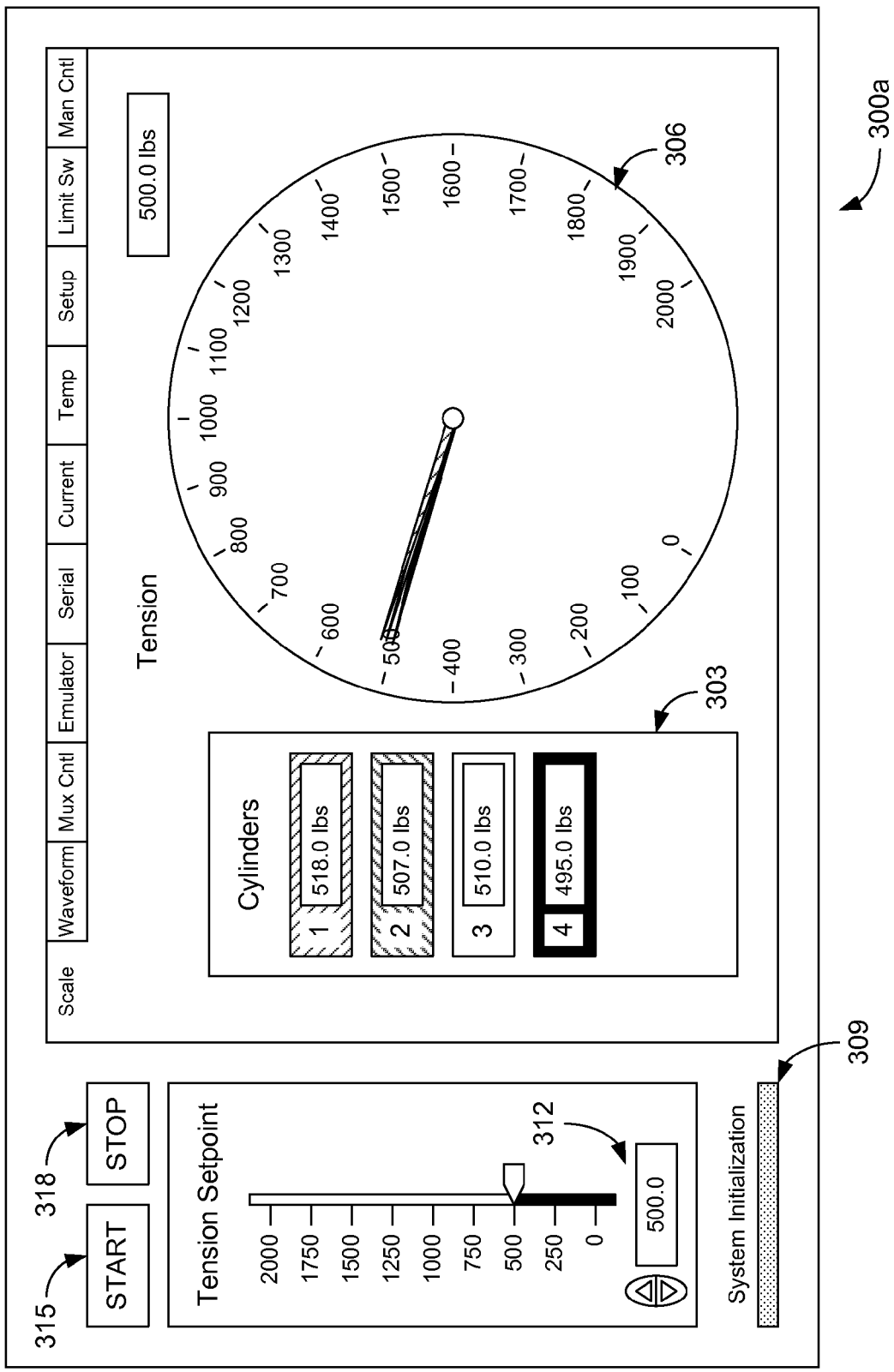
FIGS. 3-8 are examples of a user interface for a tension controller of the autotensioner system of FIG. 1 in accordance with various embodiments of the present disclosure.

Referring now to FIGS. 3-8, shown are examples of a user interface 300 for the tension controller 112. The tension controller 112 may go through an initialization process to establish communication links with the installed tensioning assemblies 109. During the initialization process, the tension controller 112 may identify each of the controlled tension cylinders 203 of the tensioning assemblies 109. For example, a predefined identification code may be transmitted by the load cell 206 and/or the drive sensor 227 of the tensioning assembly 109 (FIG. 2) in response to establishing the communication links with the tension controller 112. The controlled tension cylinders 203 may then be identified in, e.g., a tension cylinder list 303 of the user interface 300a in FIG. 3 based upon the identification code. The tension controller 112 may also obtain the current conductor tensions from the load cells 206 and display the information in the motor cylinder list 303. In the example of FIG. 3, the conductor tensions are also displayed in a meter format 306 for easier identification by a user. The corresponding meter hands are indicated by a color (or pattern) for identification. A bar icon 309 may be used to indict the progress of the initialization process.

The user may then set one or more tension setpoint(s) 312 for the conductors 103 using the user interface 300a. In the embodiment of FIG. 3, a single setpoint is used to control all of the controlled tension cylinders 203, however other embodiments may allow for setting a different tension for each conductor 103 or groups of conductors 103. The tension setpoint 312 may be set, e.g., by a sliding a pointer on a tension setpoint scale, by scrolling using arrow keys, or by entering the desired value through a keyboard or keypad. Once the tension setpoint 312 has been set, controlled tensioning of the conductors 103 by the autotensioner system may be initiated by selecting a start button 315. The controlled tensioning may be terminated by selecting the stop button 318. Tension of the conductors 103 is maintained upon termination.

Figure 4:
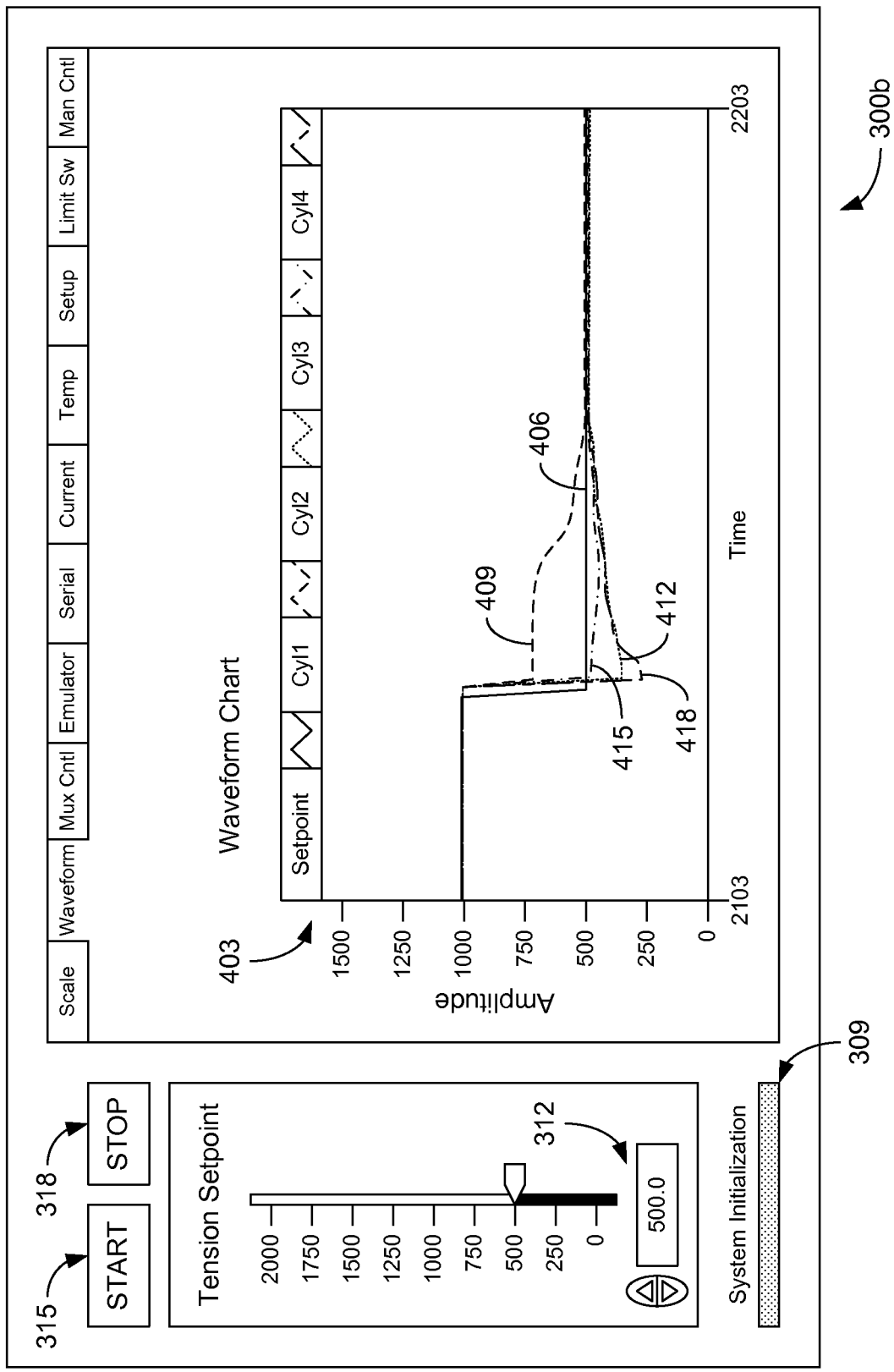

Referring to FIG. 4, shown is an example of another view of the user interface 300b for the tension controller 112. By selecting the appropriate tab of the user interface 300b, a plot 403 can be displayed that shows the changes in the conductor tensions as the autotensioner system adjusts the conductor tensions to within a predefined tolerance of the tension setpoint 312. When the start button 315 is selected by the user, the displayed setpoint curve 406 is adjusted to the tension setpoint 312 set by the user. In addition, the curves for the four tension cylinders 203 are adjusted to the current tension values for their corresponding conductors 103. In the example of FIG. 4, the tension (curve 409) on the conductor 103 connected to the first tension cylinder 203 is initially above the tension setpoint 312 (curve 406), while the tension on the conductors 103 connected to the second, third, and fourth tension cylinders 203 (curves 412, 415, 418, respectively) are below the tension setpoint 312.

The tension controller 112 then controls each of the controlled tension cylinders 203 to adjust the conductor tensions to within the predefined tolerance of the tension setpoint 312. The tension cylinders 203 may be controlled one at a time or in parallel to adjust the conductor tensions. The sequence of the tension adjustments may be based on, e.g., which conductor tension(s) are furthest away from the tension setpoint 312 or furthest from the average conductor tension. For example, in FIG. 4, the fourth cylinder may initially be controlled by the tension controller 112 to increase the tension of the corresponding conductor 103 (curve 418) while the position of the tension cylinders 203 for the other three conductors 103 are not changed. As the tension (curve 418) approaches that of the conductor 103 attached to the second cylinder (curve 412), the tension controller 112 may begin to adjust both the second and fourth cylinders 203 to simultaneously increase the tension on both conductors 103 (curves 412 and 418). The speeds of the second and fourth tension cylinders 203 may be controlled to maintain the corresponding conductor tensions within a defined range of each other. It should be noted that by increasing the conductor tensions with the second and fourth tension cylinders 203 (curves 412 and 418), the structure 106 (FIG. 1) may flex in such a way that the tension (curve 415) of the conductor 103 attached to the third cylinder 203 may decrease.

As the tensions of the conductors attached to the second and fourth cylinders 203 (curves 412 and 418) comes within a predefined range of the conductor tension (curve 415) corresponding to the third cylinder 203, the tension of the conductor 103 attached to the first cylinder 203 (curve 409) may be reduced while the tensions for the other three conductors 103 are increased (curves 412, 415, and 418). The speed of the first cylinder 203 may be varied over time by the tension controller 112 to reduce the convergence time. The speeds of the cylinders 203 may also be controlled to balance the loading on the structure 106 as the conductor tensions converge to the tension setpoint 312 (curve 406). When all of the conductor tensions (curves 409, 412, 415, and 418) fall within a predefined range of the tension setpoint 312 (e.g., within 5% of the setpoint 312), the tension cylinders 203 are stopped by the tension controller 112. The positions of the tension cylinders 203 are then maintained while the conductors 103 are secured at tension to the supporting structure 106. The tension cylinders 203 may then be uncoupled from the conductors 103.

Figure 5:
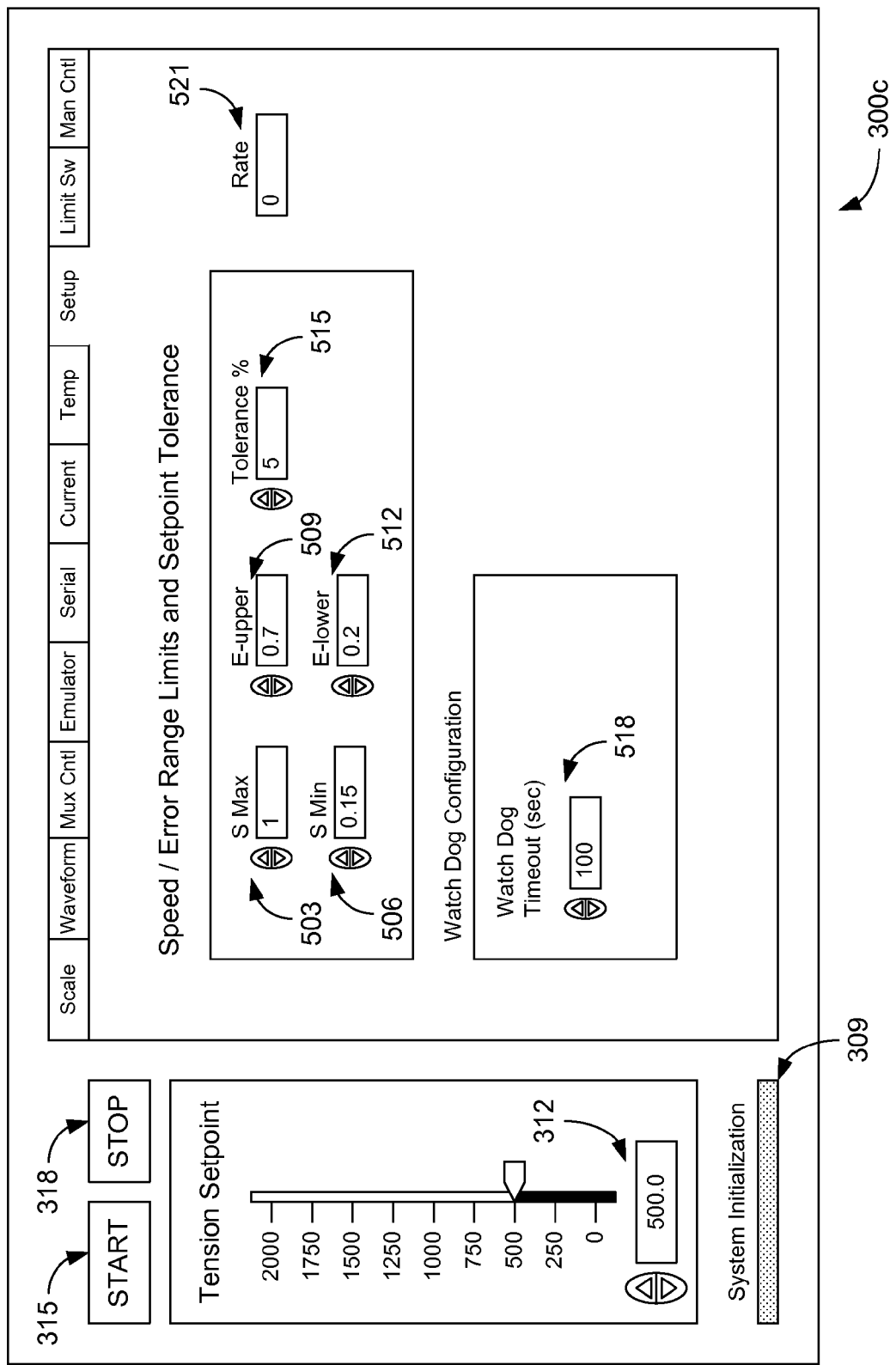
Figure 6:
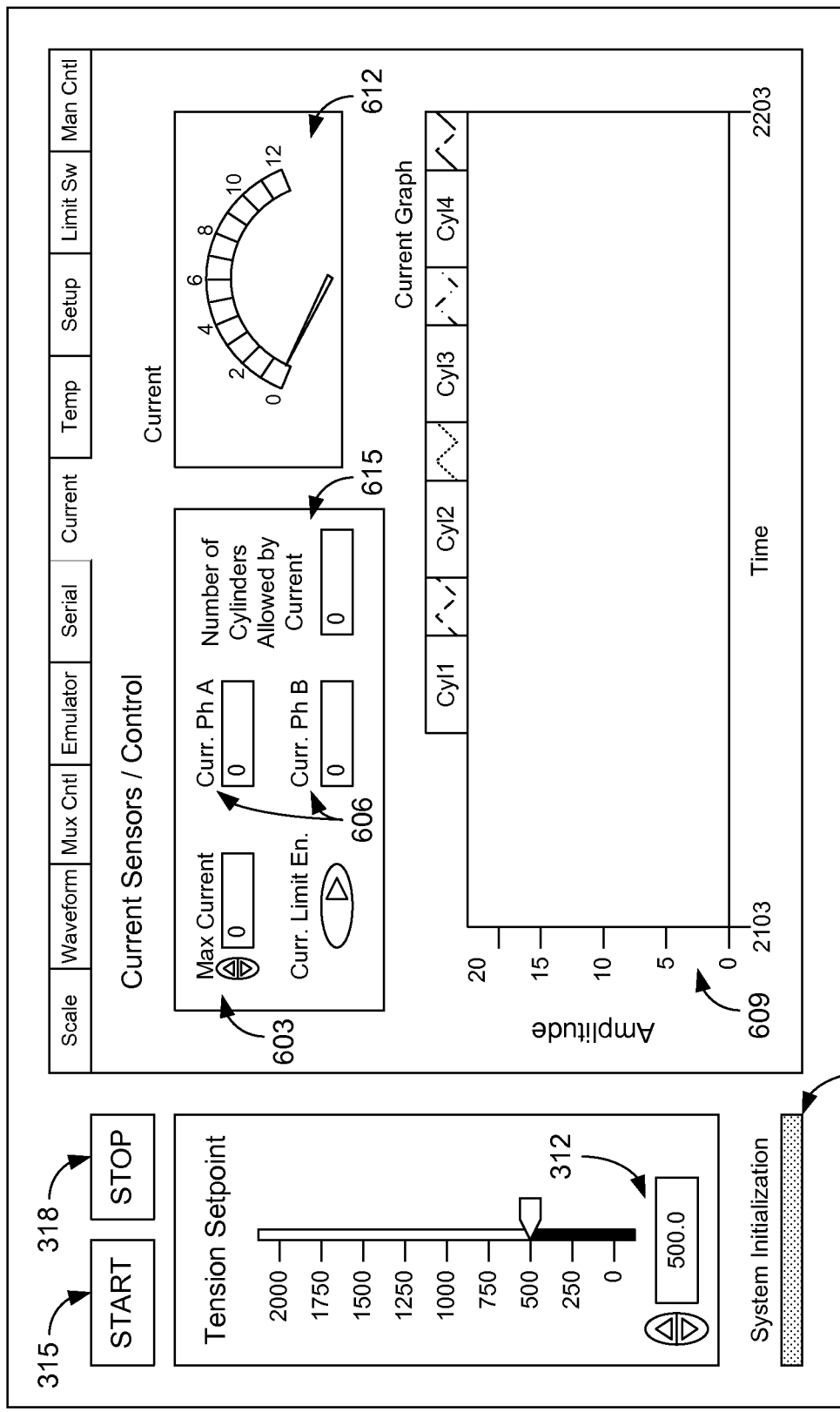
Figure 7:
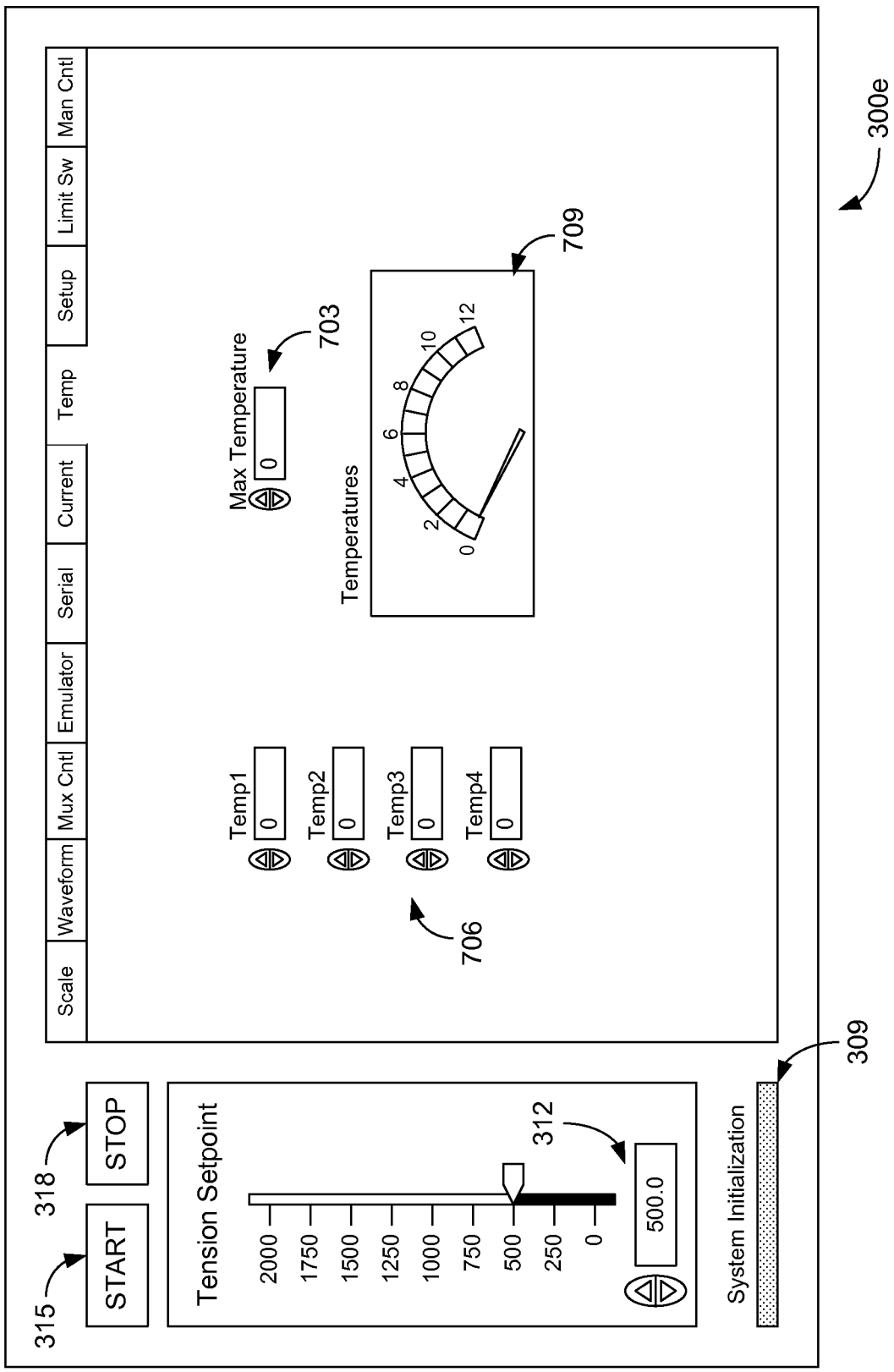

In the example of FIG. 4, the tension cylinders 203 were controlled by the tension controller 112 to allow for parallel adjustment of the conductor tensions. In other implementations, power supply capabilities (e.g., current) and tension cylinder conditions (e.g., temperature) may limit the operation of the tension cylinders 203. For instance, the tension controller 112 may operate the tension cylinders 203 one at a time to limit the current demand on the power supply. In addition, the duration that a tension cylinder 203 operates may be limited to avoid excessive heating of the cylinder 203. By selecting the appropriate tab of the user interface 300b of the tension controller 112, various operational limits may be defined for the tension controller 112. Referring to FIGS. 5-7, shown are various views of the user interface 300 for the tension controller 112 that may be used to set operational limits for the tension controller 112.

FIG. 5 shows an example of a view of the user interface 300c that may be used to setup the speed limits for the tension cylinders 203 and the tolerance for the tension setpoint 312. The maximum speed (S Max) 503 and minimum speed (S Min) 506 may be set by the system user to define the operating range of the tension cylinders 203. Upper error (E-upper) 509 and lower error (E-lower) 512 may be set that define a window of error (percentage of error values) that may be allowed by the tension controller 112 when trying to reach the predetermined speed from S Min 503 to S Max 506. The range about the tension setpoint 312 may be defined by the tolerance 515 in percent of the tension setpoint 312. For example, the tolerance may be defined as ±10%, ±5%, or ±2% of the tension setpoint 312. In other implementations, the tolerance 515 may be defined in units of the tension (e.g., ±50 lbs., ±20 lbs., etc.). Other allowable tolerances may be defined as can be appreciated. In the example of FIG. 5, the user interface 300c may also allow for defining a timeout setting 518 to limit the operational time of the tension cylinders 203. The timeout setting 518 defines a maximum amount of operational time for all tension cylinders 203. The allowed time for each cylinder 203 may be defined in other views of the user interface 300. For example, the Mux Control tab may allow setting of a maximum duration that the motor 215 of each tension cylinder 203 may be energized by the VFD 221 (FIG. 2). In some embodiments, the maximum duration may be individually set for each tension cylinder 203. The timeout setting 518 would then be the sum of the maximum durations for all of the cylinders 203. The user interface 300c may also allow the user to define the refresh rate 521 at which the tension controller 112 operates.

Referring now to FIG. 6, shown is an example of a view of the user interface 300d that may be used to setup the current limits for the tension cylinders 203. As portable power supplies (e.g., gas or diesel generators) are used to power the tension cylinder 203 through the VFD 221 (FIG. 2), the tension controller 112 may control the operation of the tension cylinders 203 to within the capabilities of the power supply. As shown in the example of FIG. 6, the maximum current 603 may be defined and enabled through the user interface 300d. The maximum current 603 may be the maximum current for each phase of the power supply. The user interface 300d may also provide indications for the phase currents 606 and cylinder currents 609. A display 612 of one or more of the current(s) may also be provided. For example, the current being drawn by a tension cylinder 203 may be displayed by selecting the icon or curve corresponding to the cylinder 203. The user interface 300d may also provide an indication 615 of the number of tension cylinders 203 that that may simultaneously operate based upon the maximum current 603. In other embodiments, the one or more current limit(s) may also be defined for the tension cylinders 203 through the user interface 300d.

Referring next to FIG. 7, shown is an example of a view of the user interface 300e that may be used to setup a temperature limit for the tension cylinders 203. The drive sensor 227 (FIG. 2) may communicate temperature data for the tension cylinder 203 to the tension controller 112 for display and control. A maximum temperature 703 may be defined through the user interface 300d. When the operating temperature of a tension cylinder 203 equals and/or exceeds the maximum temperature 703, then operation of the overheated tension cylinder 203 is restricted or prevented until the temperature falls below a predefined reset level (e.g., a percentage of the maximum temperature 703 or a defined temperature). In some cases, the tension controller 112 may allow a user to override the maximum temperature 703 for continued operation of the affected tension cylinder 203. In some embodiments, the temperature limit 706 for each tension cylinder 203 may be defined. A display 709 of one or more of the temperatures(s) may also be provided. For example, the temperature of all tension cylinders 203 may be displayed or the temperature of a specific tension cylinder 203 may be indicated by selecting the icon corresponding to the cylinder 203.

Other tabs of the user interface 300 may also allow a user to define other settings such as, e.g., limit switch position settings for each of the tension cylinders 203, serial input settings for the load cells 206 of FIG. 2 such as read buffer location, byte count, and/or timeout durations, etc., and multiplexing control settings for the tension cylinders 203 such as ranking (or ordering) of the cylinders 203, maximum and/or minimum run time durations, etc. An emulator tab may also allow the tension controller 112 to operate in an emulation mode for testing of the autotensioner system.

Figure 8:
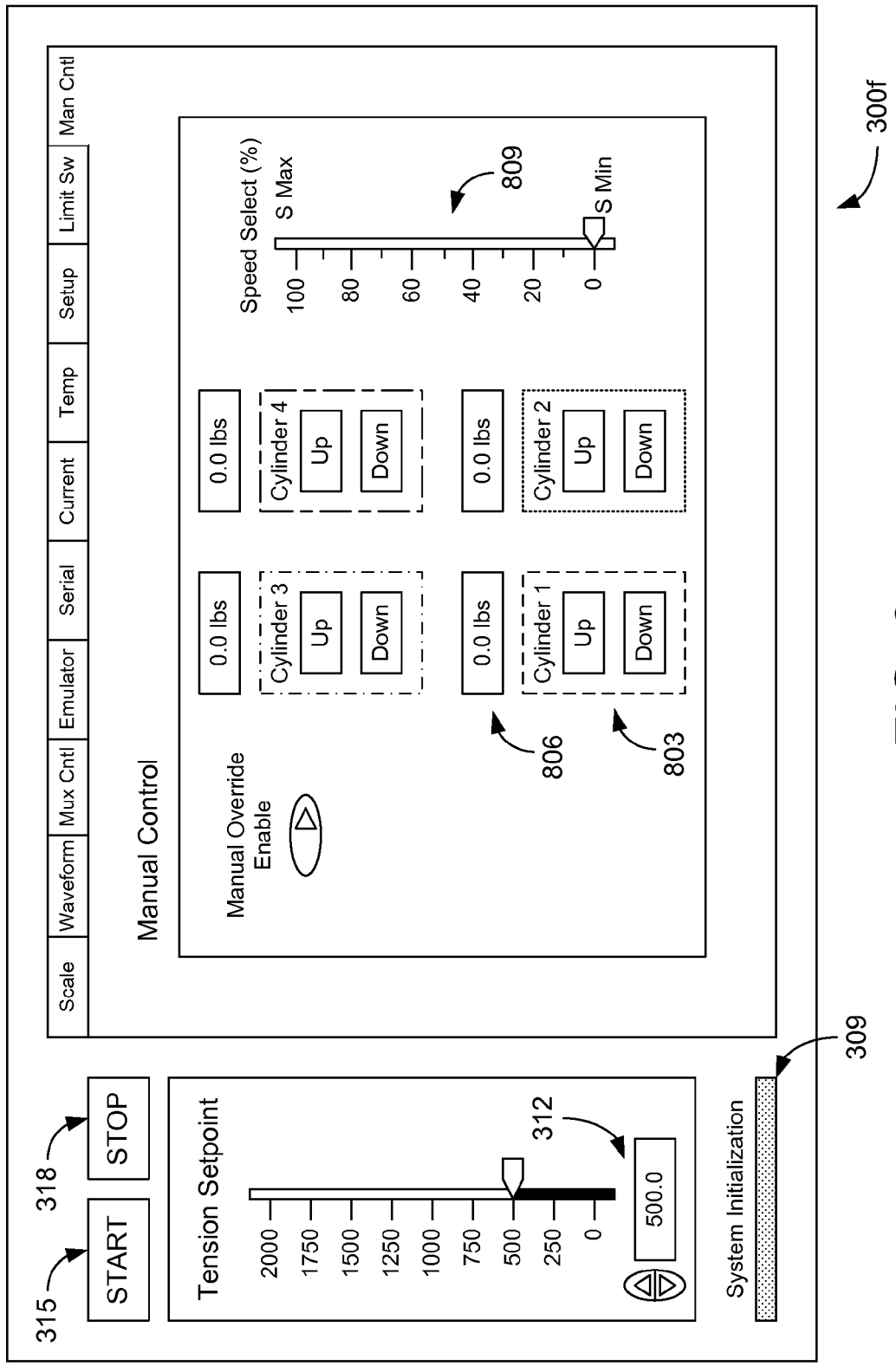

Manual control of the autotensioner system may also be provided through the tension controller 112. Referring to FIG. 8, shown is shown is an example of a view of the user interface 300f that may be used to enable manual control of the tension cylinders 203. In the example of FIG. 8, control buttons 803 allow each cylinder 203 to be individually controlled to increase (up) or decrease (down) the tension of the conductor 103 attached to the tension cylinder 203. The corresponding tension 806 is also displayed for each tension cylinder 203. The operating speed 809 of the tension cylinders 203 may also be set, e.g., by a sliding a pointer on a speed select scale.

Figure 9:
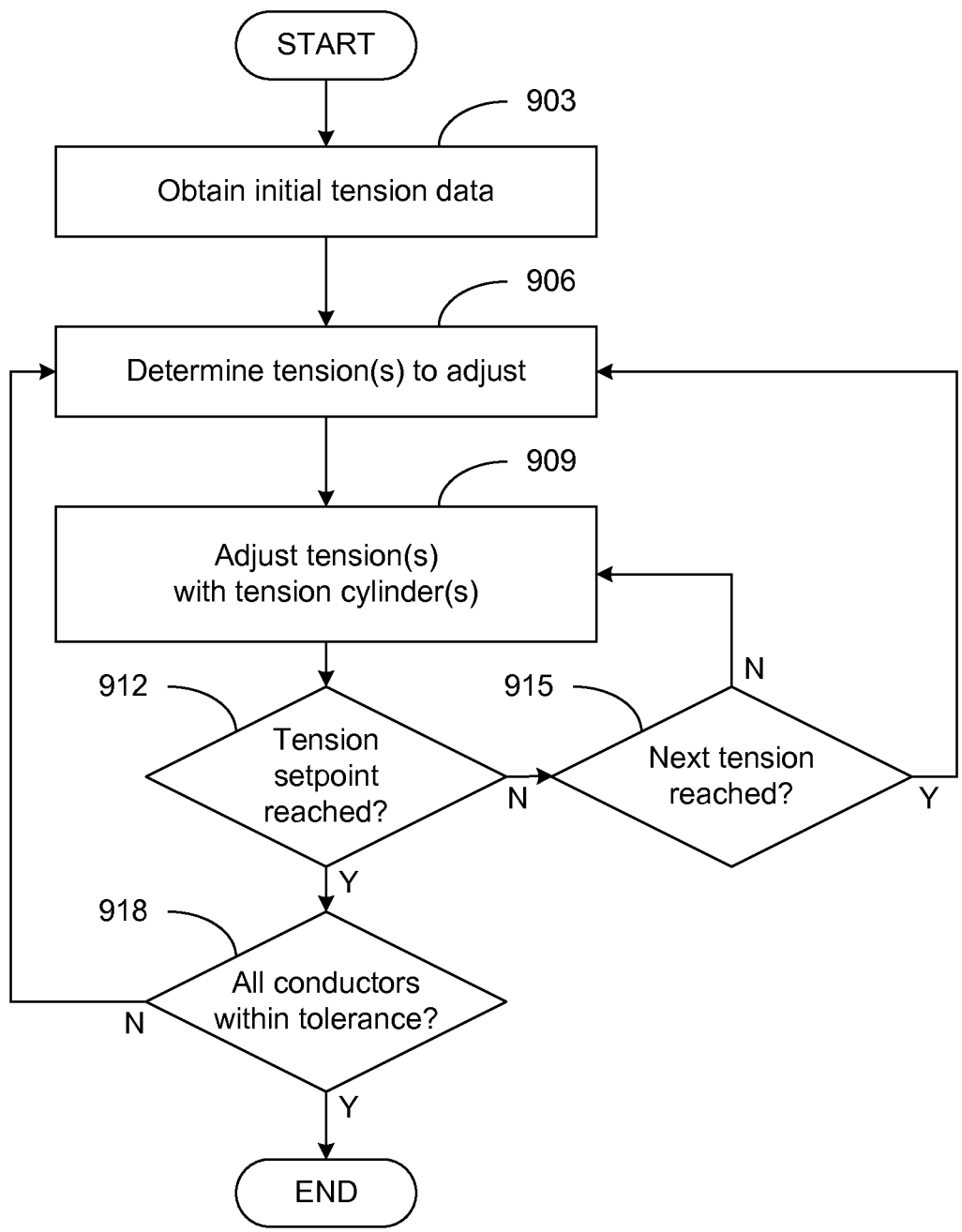
FIG. 9 is a flow chart illustrating an example of tensioning a plurality of conductors using the autotensioner system of FIG. 1 in accordance with various embodiments of the present disclosure.

Referring next to FIG. 9, shown is a flow chart illustrating the tensioning of a plurality of conductors 103 using the autotensioner system. Initially, the autotensioner system is connected to a plurality of conductors 103. For example, tensioning assemblies 109 are coupled between the structure 106 and each corresponding conductor 103 as illustrated in FIG. 1. Each conductor 103 may be brought to an initial tension that is approximately at the tension setpoint value by a drum puller and bull wheel tensioner before the tensioning assembly 109 is coupled to the conductor 103. When the tensioning assemblies 109 have been installed, communication links are established between the tension controller 112 and the tensioning assemblies 109. The links may be wireless and/or wired connections to the load cells 206, the VFDs 221, and/or the drive sensors 227 (FIG. 2) of each tensioning assembly 109. The relationship between the load cells 206, VFDs 221, and drive sensors 227 may be established during this setup process. The tension setpoint 312 and tolerance 515 (FIG. 5), as well as other variables, can also be defined during the setup process. Controlled tensioning of the conductors 103 by the tension controller 112 may then be initiated, e.g., by selecting the start button 315 (FIG. 5).

Beginning with block 903 of FIG. 9, the tension controller 112 obtains the initial tension data. The tension setpoint 312 may be obtained from memory and the tension data for the conductors 103 may be obtained from memory or from the corresponding load cells 206. Next, it is determined in block 906 which one or more of the conductor tensions will to be adjusted. In one implementation, each of the conductor tensions are compared to the tension setpoint 312 to determine which tension or tensions are furthest away from the setpoint 312. The tension controller 112 may then adjust the tension cylinder(s) corresponding to the conductor tensions that are furthest from the tension setpoint. For example, as illustrated in FIG. 4, the initial conductor tension values may be 700, 300, 450, and 230 lbs. (curves 409, 412, 415, and 418 corresponding to the first through fourth cylinders, respectively) and the tension setpoint 312 may be 500 lbs. (curve 406). As the 230 lbs. tension (curve 418) is furthest from the tension setpoint 312 of 500 lbs., it may be determined in block 906 that the tension will be adjusted using the fourth tension cylinder 203 while the remaining tensions are not actively adjusted.

In block 909, adjustment of the determined one or more conductor tension(s) is carried out by controlling the corresponding tension cylinder(s) 203. The tension cylinder 203 associated with a determined tension is driven to adjust the corresponding conductor tension toward the tension setpoint 312. For instance, the tension controller 112 may control a VFD 221 to drive the fourth cylinder 203 to increase the corresponding conductor tension, while the other tension cylinders 203 remain unchanged. As shown in the example of FIG. 4, the conductor tension (curve 418) is increased toward the tension setpoint 312 (curve 406). The speed of the tension cylinder 203 may be varied within the predefined minimum and maximum speed settings (503 and 506) of FIG. 5. As the conductor tension approaches the tension setpoint 312, the speed of the corresponding tension cylinder 203 can be automatically reduced by the tension controller 112 to avoid overshoot of the setpoint 312.

As the conductor tension is adjusted by the tension cylinder 203, the tension controller 112 continues to monitor the tensions corresponding to each of the tension cylinders 203. The conductor tensions are refreshed and evaluated at a rate 521 (FIG. 5) that may be defined in the user interface 300c of FIG. 5. In block 912 of FIG. 9, the revised tension for each conductor 103 is examined to determine if it is within the predefined tolerance 515 (FIG. 5) of the setpoint 312. If none of the tensions have reached the tension setpoint 312, then in block 915 the conductor tensions are compared to determine if the tension(s) being adjusted has moved to within the predefined tolerance 515 of the next conductor tension. If none of the tension(s) have reached the next conductor tension, then the tension controller 112 continues to adjust the conductor tension(s) in block 909 and to monitor the changes in the conductor tensions in blocks 912 and 915 at the refresh rate 521. The tension adjustment and monitoring in blocks 909, 912, and 915 may be carried out concurrently as described above or may be performed in an iterative or step-wise fashion by first adjusting the determined conductor tension(s) by a determined amount in block 909 and then evaluating the tensions in blocks 912 and 915 before another tension adjustment is preformed in block 909. It should also be noted that while the same tolerance 515 is used to evaluate whether the tension setpoint 312 or the next conductor tension has been reached, in other implementations a different tolerance range may be defined for each condition.

If in block 915 a conductor tension being adjusted falls within the tolerance 515 of the next conductor tension, then the flow returns to block 906 where the tension controller 112 reevaluates the current conductor tensions to determine which tension(s) to adjust. For example, as the tension corresponding to the fourth tension cylinder 203 (curve 418) increases in FIG. 4, the tension (curve 418) approaches the conductor tension corresponding to the second tension cylinder 203 (curve 412). While the conductor tension corresponding to the fourth tension cylinder 203 (curve 418) remains outside the tolerance range 515 of the conductor tension corresponding to the second tension cylinder 203 (curve 412), the tension controller 112 continues to increase the tension (curve 418) to reach the tension setpoint 312. When the tension corresponding to the fourth tension cylinder 203 (curve 418) falls within the tolerance range 515 of the next conductor tension (curve 412), the tension controller 112 determines which tensions to adjust at this point. As illustrated in FIG. 4, both the second and the fourth tension cylinders 203 may be concurrently controlled through their VFDs 221 to simultaneously increase both conductor tensions (curves 412 and 418) while maintaining the tensions within the tolerance 515 of each other. As can be seen in FIG. 4, the speed of the fourth tension cylinder 203 is adjusted (e.g., reduced) to synchronize the adjustment of the conductor tension corresponding to the fourth tension cylinders 203 (curve 418) with the adjustment of the conductor tension corresponding to the second tension cylinders 203 (curve 412). In this way, both tensions (curves 412 and 418) are increased in a balanced fashion.

If the power supply does not allow for concurrent operation of two tension cylinders 203, then both tensions may be increased in an iterative or step-wise fashion while maintaining the conductor tensions within the tolerance range 515 of each other. For example, the second tension cylinder 203 may be driven until the corresponding conductor tension increases to the upper tolerance 515 of the conductor tension corresponding to the fourth tension cylinder 203. The fourth tension cylinder 203 may then be driven until the corresponding conductor tension increases to the upper tolerance 515 of the conductor tension corresponding to the second tension cylinder 203. This iterative adjustment in the conductor tensions may be continued until the tensions fall within the tolerance range of the tension setpoint 312 (curve 406) or the next conductor tension (e.g., curve 415 of FIG. 4).

In the example of FIG. 4, the tensions corresponding to both the second and the fourth tension cylinders 203 (curves 412 and 418) are simultaneously increased until falling within the tolerance 515 of the conductor tension corresponding to the third tension cylinder 203 (curve 415). When at least one of the conductor tensions (curves 412 and 418) has reached the next conductor tension (curve 415) as evaluated in block 915 of FIG. 9, then the tension controller 112 evaluates the current conductor tensions in block 906 of FIG. 9 to determine which tension(s) should be adjusted. In the example of FIG. 4, the conductor tension corresponding to the first tension cylinder 203 (curve 409) is the furthest from the tension setpoint 312 (curve 406). The conductor tension is adjusted by driving the first tension cylinder 203 to reduce the corresponding tension (curve 409) toward the tension setpoint 312 (curve 406). In some implementations, the other conductor tensions may not be adjusted while the tension corresponding to the first tension cylinder 203 is reduced. In other implementations, some or all of the other conductor tensions may be simultaneously adjusted. This evaluation may be based, at least in part, upon the distance of the conductor tensions from the tension setpoint 312 and/or the power supply capabilities available to drive the tension cylinders 203.

In the example of FIG. 4, the conductor tensions corresponding to the second, third, and fourth tension cylinders 203 are slowly increased while the tension corresponding to the first tension cylinder 203 is decreased. As can be seen in FIG. 4, the tension controller 112 adjusts the rate at which the conductor tension corresponding to the first tension cylinder 203 (curve 409) is reduced as the tension approaches the tension setpoint 312 (curve 406). The speeds of the tension cylinders 203 may also be varied by the tension controller 12 to control the convergence rates of the conductor tensions to the tension setpoint 312. For example, in FIG. 4 that conductor tensions (curves 109-418) are adjusted such that the tensions reach the tension setpoint 312 (curve 406) at approximately the same time. In other implementations, the conductor tensions may be adjusted in an iterative or step-wise fashion as discussed above. Depending on the power supply capabilities, only a portion of the tension cylinders 203 may be operated at any given time.

Referring back to block 912 of FIG. 9, if at least one of the conductor tensions reaches the tension setpoint 312 by falling within the predefined tolerance 515 of the setpoint 312, then it is determined whether all of the conductor tensions are within the predefined tolerance 515 in block 918. If only a portion of the conductor tensions have reached the tension setpoint 312, then the flow returns to block 906 where the tension controller 112 reevaluates the current conductor tensions to determine which tension(s) remain to be adjusted. In block 909, the corresponding tension cylinder(s) 203 are used to adjust the tension(s) until all conductor tensions are within the predefined tolerance 515 of the tension setpoint 312. In some implementations, the tension controller 112 may also adjust the conductor tensions so that they are within a predefined tolerance of each other. This may entail further adjustment of the conductor tensions after all tensions are within the tolerance range 5115 of the tension setpoint 312. For example, the cylinder tensions indicated in the tension cylinder list 303 of FIG. 3 are all within a 5% tolerance of the indicated tension setpoint 312 and are within a 5% tolerance of each other. If all of the conductor tensions are within tolerance, then the tensions are maintained to allow connection of the conductors 103 to the structure 106 (FIG. 1).

The conductor tensions may also be adjusted in a different order or combination. The determination of which tension or tensions are adjusted may be based upon the magnitude of the difference between the current conductor tension and the tension setpoint 312. In the example of FIG. 4, when the tension corresponding to the fourth tension cylinder (curve 418) reaches the tension corresponding to the second tension cylinder (curve 412), curves 412 and 418 are approximately 200 lbs. below the tension setpoint 312 (curve 406). As the same time, the conductor tension corresponding to the first tension cylinder (curve 409) is approximately 200 lbs. above the tension setpoint 312 (curve 406). Because the magnitudes are approximately the same, the tension controller 112 may control the first tension cylinder 203 to decrease the corresponding tension (curve 409) while simultaneously controlling the second and fourth tension cylinders 203 to increase the corresponding tensions (curves 412 and 418). In this variation, tensions above and below the tension setpoint 312 converge simultaneously. When the conductor tensions corresponding to the second and fourth tension cylinders 203 (curves 412 and 418) reach the tension of the third tension cylinder 203 (curve 415), all four tension may be adjusted to converge toward the tension setpoint 312 (curve 406).

As previously noted, a plurality of tension setpoints may be defined for each conductor 103 or for groups of conductors 103. In that case, the flow chart of FIG. 9 can be used to adjust the conductor tensions to the corresponding tension setpoint (s). In some implementations, the tension cylinders 203 may be controlled to simultaneously converge the conductor tensions to the corresponding tension setpoints. In other implementations, the tensions may be iteratively adjusted toward their corresponding tension setpoints. For example, one or more conductor tension(s) above the corresponding setpoint may first be decreased by a determined amount (e.g., a fraction of the difference between the current conductor tension and the corresponding setpoint) while the tensions below the corresponding setpoint are not changed. The conductor tensions below the corresponding setpoint may then be increased by a determined amount while not adjusting the tension above their corresponding setpoints. These adjustments may be repeated in a step-wise fashion until the conductor tensions reach their respective tension setpoints.

Other sequences for adjusting the conductor tensions toward the corresponding tension setpoints may also be implemented. For example, pairs of conductors 103 may be mounted on opposite sides of the supporting structure 106 as illustrated in FIG. 1. In some implementations, the tension of one of the pair of conductors 103 may be first adjusted to within a tolerance of the tension of the other conductor 103 and then both tensions may be simultaneously adjusted to reach the tension setpoint to reduce the strain on the support structure 106. In other embodiments, the tensions of each of the pair of conductors 103 may be simultaneously adjusted at different rates to converge toward the tension setpoint. Similarly, the tensions of all of the pairs of conductors may be simultaneously adjusted at different rates to converge to the tension setpoint.

Figure 10:
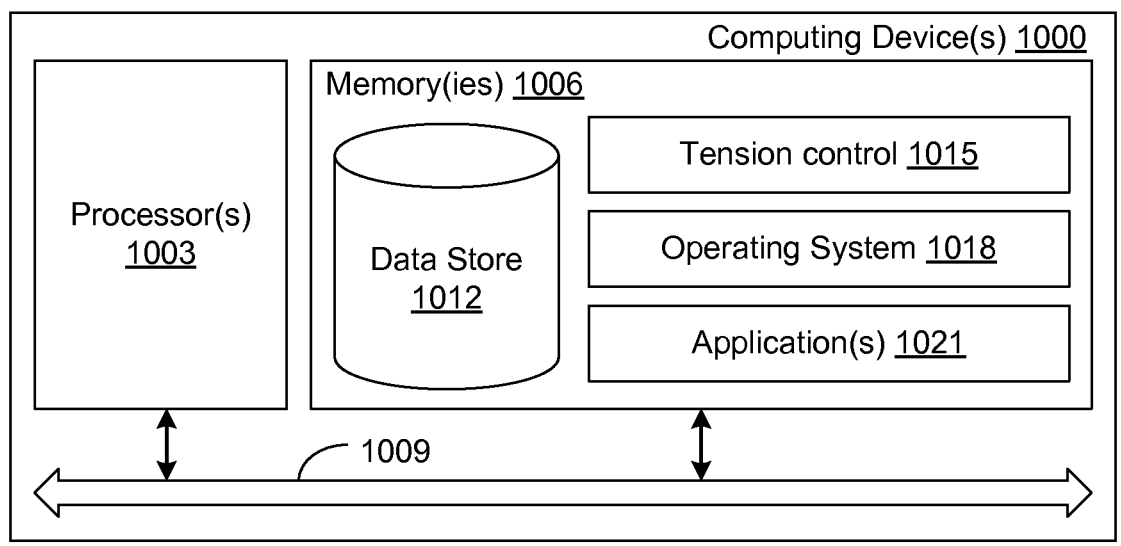
FIG. 10 is a schematic block diagram that provides one example illustration of a computing device employed in the autotensioner system of FIG. 1 in accordance with various embodiments of the present disclosure.

With reference now to FIG. 10, shown is a schematic block diagram of a computing device 1000 that may be used to implement the tension controller 112 according to various embodiments of the present disclosure. The computing device 1000 includes at least one processor circuit, for example, having a processor 1003 and a memory 1006, both of which are coupled to a local interface 1009. To this end, the computing device 1000 may comprise, for example, at least one computer, tablet, or like device. The local interface 1009 may comprise, for example, a data bus with an accompanying address/control bus or other bus structure as can be appreciated. The computing device 1000 includes a display for rendering of generated graphics such as, e.g., a user interface and an input interface such, e.g., a keypad or touch screen to allow for user input. In addition, the computing device 1000 includes communication interfaces (not shown) that allow the computing device 1000 to communicatively couple with other devices such as, e.g., components of the tensioning assemblies 109 (FIG. 1). The communication interfaces may include one or more wireless connection(s) such as, e.g., Bluetooth or other radio frequency (RF) connection and/or one or more wired connection(s).

Stored in the memory 1006 are both data and several components that are executable by the processor 1003. In particular, stored in the memory 1006 and executable by the processor 1003 are a tension control application 1015, an operating system 1018, and/or other applications 1021. It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1006 and are executable by the processor 1003. In this respect, the term "executable" means a program file that is in a form that can ultimately be run by the processor 1003.

Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the tension control application 1015, the operating system 1018, application(s) 1021, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow chart of FIG. 9 shows the functionality and operation of an implementation of portions of the tension control application 1015. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flow chart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the tension control application 1015 and/or application(s) 1021, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An autotensioner system, comprising:
    a plurality of tensioning assemblies coupled between a structure and corresponding conductors, individual ones of the plurality of tensioning assemblies comprising a tension cylinder coupled at a first end to the structure and at a second end to a load cell; and
    a tension controller configured to control each of the plurality of tensioning assemblies to adjust a tension of the corresponding conductors to within a predefined tolerance of a corresponding tension setpoint.

2. The system of claim 1, wherein the tension controller is configured to:
    receive a current tension from the load cell of each corresponding conductor; and
    control a length of at least one tension cylinder to adjust the tension of the corresponding conductor based at least in part upon the current tension of the corresponding conductor.

3. The system of claim 2, wherein the tension controller obtains the current tension of each corresponding conductor through a wireless connection with the load cell.

4. The system of claim 1, wherein the tension cylinder comprises a screw drive driven by an electric motor supplied by a variable frequency drive (VFD) communicatively coupled to the tension controller.

5. The system of claim 4, wherein the tension controller controls an output frequency of the VFD based at least in part upon a current tension of the corresponding conductor and the corresponding tension setpoint.

6. The system of claim 1, wherein the plurality of tensioning assemblies comprise pairs of tensioning assemblies coupled on opposite sides of the structure.

7. The system of claim 1, wherein the corresponding tension setpoint is the same setpoint for all of the corresponding conductors.

8. A method, comprising:
    receiving a current conductor tension for each of a plurality of conductors, the current conductor tensions received from a plurality of tensioning assemblies coupled between a structure and a corresponding one of the plurality of conductors, individual ones of the plurality of tensioning assemblies comprising a tension cylinder coupled at a first end to the structure and at a second end to a load cell; and
    adjusting the current conductor tension of one of the plurality of conductors by remotely controlling the corresponding tensioning assembly, the adjustment based at least in part upon the plurality of current conductor tensions and a tension setpoint.

9. The method of claim 8, wherein the current conductor tensions of at least two of the plurality of conductors are simultaneously adjusted by remotely controlling the corresponding tensioning assemblies.

10. The method of claim 9, wherein the current conductor tension of one of the at least two conductors is increased while the conductor tension of another of the at least two conductors is decreased.

11. The method of claim 9, wherein the at least two conductors are on opposite sides of the structure.

12. The method of claim 8, further comprising:
    receiving a conductor tension for each of the plurality of conductors during adjustment of the conductor tension of the one conductor; and
    terminating tension adjustment of the one conductor if the received conductor tension corresponding to the one conductor is within a predefined tolerance of the tension setpoint.

13. The method of claim 12, wherein the conductor tensions corresponding to the one conductor and the other conductor are simultaneously adjusted toward the tension setpoint.

14. The method of claim 13, wherein the corresponding tensioning assemblies are controlled to maintain the conductor tension corresponding to the one conductor within the predefined tolerance of the conductor tension of the other conductor while the corresponding conductor tensions are adjusted.

15. The method of claim 8, further comprising:
    receiving a conductor tension for each of the plurality of conductors during adjustment of the conductor tension of the one conductor; and
    adjusting tension of another of the plurality of conductors by remotely controlling the corresponding tensioning assembly if the received conductor tension corresponding to the one conductor is within a predefined tolerance of the received conductor tension of the other conductor.

16. A non-transitory computer readable medium embodying a program executable in at least one computing device, comprising:
    code that receives a plurality of conductor tensions, each conductor tension corresponding to one of a plurality of conductors coupled to a structure through a corresponding tensioning assembly;
    code that determines which of the plurality of conductor tensions to adjust based at least in part upon the plurality of received conductor tensions and at least one tension setpoint; and
    code that adjusts the conductor tension by controlling the corresponding tensioning assembly coupled to the corresponding conductor.

17. The non-transitory computer readable medium of claim 16, further comprising:
    code that receives a plurality of current conductor tensions during adjustment of the conductor tension, each current conductor tension corresponding to one of the plurality of conductors; and
    code that adjusts a rate at which the conductor tension is adjusted based at least in part upon the corresponding current conductor tension and the at least one tension setpoint.

18. The non-transitory computer readable medium of claim 16, wherein the code determines a plurality of conductor tensions to adjust based at least in part upon the plurality of received conductor tensions and at least one tension setpoint.

* * * * *